(12) United States Patent
Thompson et al.

(10) Patent No.: US 8,468,636 B2
(45) Date of Patent: Jun. 25, 2013

(54) APPARATUS, SYSTEMS AND METHODS FOR DEBRIS REMOVAL FROM AN ANTENNA

(75) Inventors: Geoffrey Thompson, West Yorkshire (GB); Andy Stanford, West Yorkshire (GB)

(73) Assignee: Eldon Technology Limited, Keighley (GB)

( * ) Notice: Subject to any disclaimer, the term of this patent is extended or adjusted under 35 U.S.C. 154(b) by 471 days.

(21) Appl. No.: 12/698,782

(22) Filed: Feb. 2, 2010

(65) Prior Publication Data

US 2011/0186077 A1    Aug. 4, 2011

(51) Int. Cl.
*B08B 7/04* (2006.01)
(52) U.S. Cl.
USPC ............... 15/97.1; 15/250.001; 15/250.13; 15/250.22; 15/250.29; 15/250.3; 15/250.31; 134/6
(58) Field of Classification Search
USPC ............ 15/97.1, 250.001, 250.19, 250.13, 15/250.21, 250.22, 250.29, 250.3, 250.31; 134/6
See application file for complete search history.

(56) References Cited

U.S. PATENT DOCUMENTS

| 2,784,438 | A | * | 3/1957 | Petersen | 15/250.19 |
|---|---|---|---|---|---|
| 5,464,481 | A | * | 11/1995 | Lietz et al. | 134/6 |
| 5,469,595 | A | * | 11/1995 | Dara | 15/250.19 |
| 6,037,913 | A | * | 3/2000 | Johnson | 343/882 |
| 6,158,791 | A | * | 12/2000 | Drew | 294/54.5 |
| 2006/0213027 | A1 | * | 9/2006 | Oberembt | 15/414 |
| 2008/0178408 | A1 | * | 7/2008 | King | 15/250.06 |
| 2008/0211730 | A1 | * | 9/2008 | Woosnam | 343/878 |
| 2010/0097289 | A1 | * | 4/2010 | Onweller et al. | 343/872 |
| 2011/0193763 | A1 | * | 8/2011 | Onweller et al. | 343/872 |

FOREIGN PATENT DOCUMENTS

CN    202423530 U    *    9/2012

* cited by examiner

*Primary Examiner* — Alexander Markoff
(74) *Attorney, Agent, or Firm* — Lowe Graham Jones PLLC

(57) ABSTRACT

Debris removal systems and methods are operable to remove debris, such as snow, from a surface. An exemplary embodiment has a wiper blade configured to remove debris from a surface in response to a movement of the wiper blade; a spring coupled to the wiper blade, wherein the spring is configured to store potential energy as the spring is biased from a relaxed position to a biased position; and a motor coupled to the spring, wherein the motor is configured to convert received electrical power into mechanical power that biases the spring. The spring is released from the biased position to release the stored potential energy as the spring returns to the relaxed position. The released potential energy from the spring is converted to mechanical energy that moves the wiper blade.

8 Claims, 3 Drawing Sheets

APPARATUS, SYSTEMS AND METHODS FOR DEBRIS REMOVAL FROM AN ANTENNA

BACKGROUND

Satellite antennas, also referred to as dishes, may accumulate debris that interferes with the intended purpose of the devices. Debris may include snow, ice, dirt, dust, or other matter. Such debris may accumulate on a signal-receiving or signal-transmitting surface that is exposed to an ambient environment. For example, a satellite dish may accumulate snow on its surface that blocks or interferes with the reception or transmission of communication signals. Accordingly, when performance of the satellite dish is degraded due to debris accumulation on an exposed surface, the surface will require removal of the debris.

In some situations, the surface of the antenna may be periodically cleaned so as to reliably maintain the performance characteristics of the antenna. Debris may be removed manually from the surface of the antenna. However, there may be an undesirable time delay while service personnel are dispatched to perform the manual task of debris removal. And, the attendant labor charges may be relatively expensive.

In other situations, the debris may be removed from the surface of the antenna using a debris-removing device, such as a heater or the like, when the debris is snow and/or ice. However, such debris removal devices require a source of power. Accordingly, the initial cost of the electronic debris removal device, the cost of the power source, and the associated operating costs of such electronic debris removal devices and their associated power source may be relatively expensive.

Accordingly, there is a need in the arts for improved antenna debris removal devices and methods.

SUMMARY

Systems and methods of removing debris from a surface are disclosed. An exemplary embodiment has a wiper blade configured to remove debris from a surface in response to a movement of the wiper blade; a spring coupled to the wiper blade, wherein the spring is configured to store potential energy as the spring is biased from a relaxed position to a biased position; and a motor coupled to the spring, wherein the motor is configured to convert received electrical power into mechanical power that biases the spring. The spring is released from the biased position to release the stored potential energy as the spring returns to the relaxed position. The released potential energy from the spring is converted to mechanical energy that moves the wiper blade.

BRIEF DESCRIPTION OF THE DRAWINGS

Preferred and alternative embodiments are described in detail below with reference to the following drawings.

DETAILED DESCRIPTION

Figure 1:
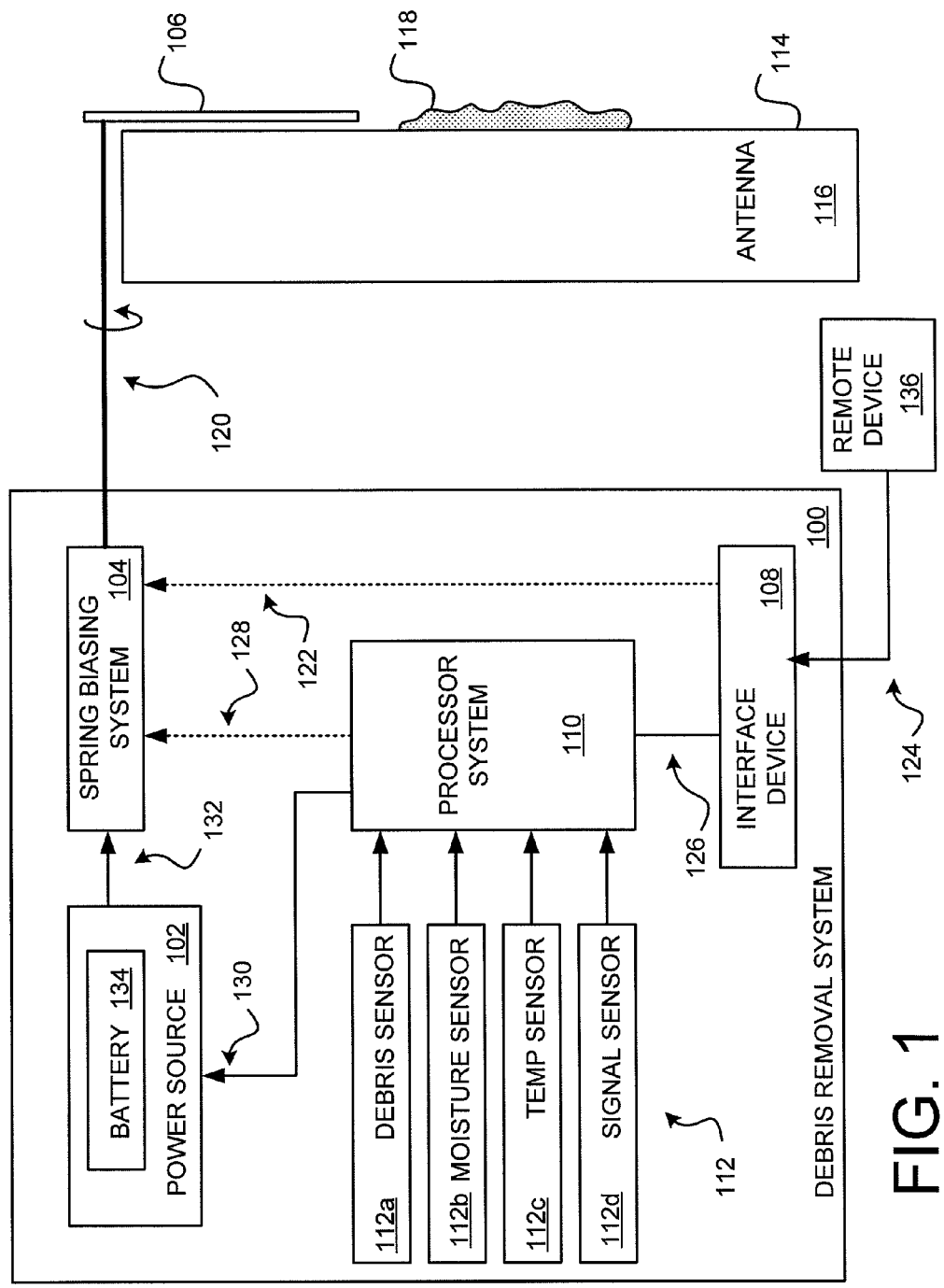
FIG. 1 is a block diagram of an embodiment of a debris removal system.

FIG. 1 is a block diagram of an embodiment of an exemplary debris removal system 100. Embodiments of the debris removal system 100 comprise a power source 102, a spring biasing system 104, a wiper blade 106, an optional interface device 108, and optional processor system 110, and one or more optional sensors 112. The debris removal system 100 is configured so that actuation of the wiper blade 106 over, or in proximity to, a surface 114 of an antenna 116 causes removal of debris 118 that has accumulated on the surface 114.

The spring biasing system 104 is configured to convert electrical power received from the power source 102 into mechanical energy over a period of time prior to actuation of the wiper blade 106. Thus, the power source 102 may be a low capacity power device that provides the requisite low level of power over a relatively long period of time that is necessary for actuation of the wiper blade 106. The power source 102 is preferably a renewable energy power source that generates power from energy provided by the environment. The power source 102 provides electrical energy at a relatively low level of current and/or voltage over a relatively long duration of time so as to minimize the capacity of the power source 102. That is, the current and/or voltage of the electrical power provided by the power source 102 is not sufficient to operate the wiper blade 106 on a real time, or near real time, basis.

The spring biasing system 104 is coupled to the wiper blade 106 via a wiper rotor 120. The wiper rotor 120 positions and orients the wiper blade 106 with respect to the surface 114 of the antenna 116. When actuated, the spring biasing system 104 provides a rotational force to the wiper rotor 120 so that the wiper blade 106 rotates, thereby dislodging the debris 118. In other embodiments, the spring biasing system 104 may be coupled to the wiper blade 106 such that the wiper blade 106 may be moved in a linear manner over the surface 114 of the antenna 116.

In some embodiments, the interface device 108 is communicatively coupled to the spring biasing system 104 via connection 122. When a suitable input is provided on connection 124 to the interface device 108, the spring biasing system 104 is actuated to move the wiper blade 106 so as to dislodge the debris 118. In some embodiments, the interface device 108 is an electrical device that generates an electrical communication signal that is communicated to the spring biasing system 104 over the connection 122. In other embodiments, the interface device 108 is a mechanical device that causes a physical movement or the like of the connection 122.

In some embodiments, the interface device 108 is communicatively coupled to the processor system 110 via connection 126. When a suitable input is provided on the connection 124 to the interface device 108, a suitable control signal is communicated from the interface device 108 to the processor system 110, via the connection 126. In response to receiving the control signal from the interface device 108, the processor system 110 communicates a second suitable electrical control signal, via connection 128, to the spring biasing system 104. In response to receiving the control signal, the spring biasing system 104 moves the wiper blade 106 so as to dislodge the debris 118.

Alternatively, or additionally, the processor system 110 may communicate a suitable control signal, via connection 130, to the power source 102. In response to receiving the control signal from the processor system 110, the power source 102 provides power to the spring biasing system 104, via connection 132, which in turn powers the spring biasing system 104 to move the wiper blade 106 so as to dislodge the debris 118.

Some embodiments include one or more sensors 112. The sensors monitor the condition of the surface 114 such that the spring biasing system 104 moves the wiper blade 106 so as to dislodge the debris 118 when the monitored condition reaches a threshold value. Non-limiting examples include a debris sensor 112a, a moisture sensor 112b, a temperature (temp) sensor 112c, and/or a signal sensor 112d. The sensors 112 are configured to monitor the antenna 116 and/or ambient conditions that are related to the accumulation of the debris 118 on the surface 114 of the antenna 116.

For example, the debris sensor 112a may monitor a weight of the antenna 116 or a pressure exerted on a portion of the surface 114. An increase in weight or pressure to a predefined threshold value may be associated with an accumulation of the debris 118, such as snow and/or ice, on the surface 114 of the antenna 116. In response to a signal communicated from the debris sensor 112a to the processor system 110, the processor system 110 then generates the control signal that actuates the spring biasing system 104.

Similarly, the moisture sensor 112b may sense accumulation of moisture, or changes in moisture, on the surface 114. An increase and/or change of sensed moisture to a predefined threshold value may be associated with the accumulation of the debris 118, such as snow and/or ice. In response to a signal communicated from the moisture sensor 112b to the processor system 110, the processor system then generates a control signal that actuates the spring biasing system 104.

Temperature may also be associated with accumulation of the debris 118 on the surface 114 of the antenna 116. For example, when the ambient temperature of the surface 114 drops below a predefined threshold value, it may be known that snow, ice, or the like has likely accumulated on the surface 114. In response to a signal communicated from the temperature sensor 112c to the processor system 110, the processor system then generates a control signal that actuates the spring biasing system 104.

Additionally, or alternatively, the signal sensor 112d may sense a characteristic of a signal detected at the antenna 116, such as, but not limited to, signal strength, signal quality, and/or signal noise. When the signal characteristic drops to or below a predefined threshold value, a signal communicated from the signal sensor 112d to the processor system 110. In response to receiving the signal form the signal sensor 112d, the processor system generates a control signal that actuates the spring biasing system 104.

Additionally, or alternatively, the processor system 110 may be communicatively coupled to the power source 102 for management of various power functions related to the accumulation and/or delivery of electrical power by the power source 102. For example, the power source 102 may include a battery 134 or other suitable power storage element (not shown). The processor system 110 may be configured to monitor power levels in the battery 134 such that the power source 102 stops accumulating power when the battery 134 becomes fully charged.

The interface device 108 may be a mechanical device. For example, the connection 124 may be a cord, string, wire or the like that is manually actuated by a person. For example, if the accumulation of the debris 118, such as snow and/or ice, interferes with signal reception of the antenna 116, the user may walk outside to reach the cord, string, wire or the like to manually actuate the debris removal system 100 to dislodge the debris 118.

Alternatively, or additionally, the interface device 108 may be an electronic device that receives a suitable control signal via the connection 124 from a remote device 136. Accordingly, the connection 124 may be a wire-based connection, such as by a conductor, cable, or the like, or may be a wireless connection, such as a radio frequency (RF) or an infrared connection (IR). Non-limiting examples of the remote device 136 include a remote control or an electronic device, such as a set top box or other consumer appliance. The control signal may be initiated by a person using the remote control or other consumer appliance. Alternatively, or additionally, the signal may be initiated remotely using the set top box or the other consumer appliance.

Some embodiments may have two or more interface devices 108. For example, a first mechanical interface device 108 may be an electronic device and a second interface device 108 may be a mechanical device.

Figure 2:
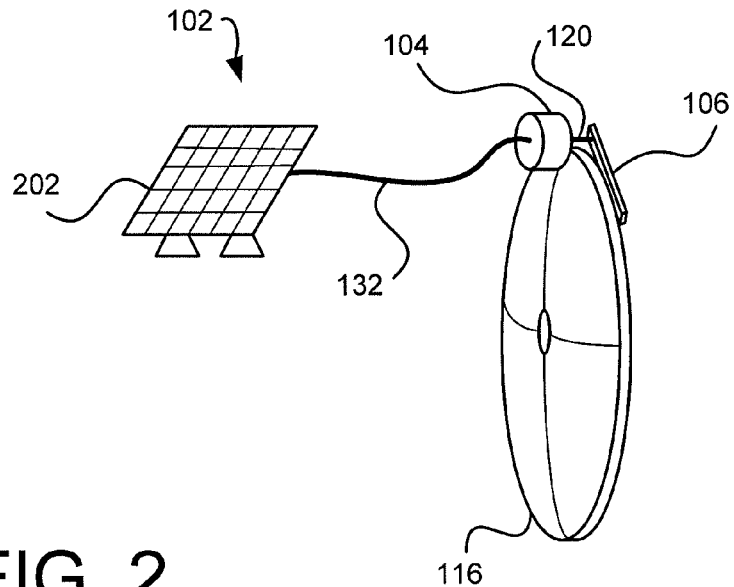
FIG. 2 is a perspective view of an embodiment of a debris removal system employing a solar cell array.

FIG. 2 is a perspective view of an embodiment of a debris removal system 100 employing a solar cell array 202. The solar cell array 202 is a suitable solar cell device that generates power upon receiving incident sunlight. Alternatively, or additionally, the power source 102 may be a suitable wind turbine that generates the power. Other sources of power may be used in other embodiments.

Figure 3:
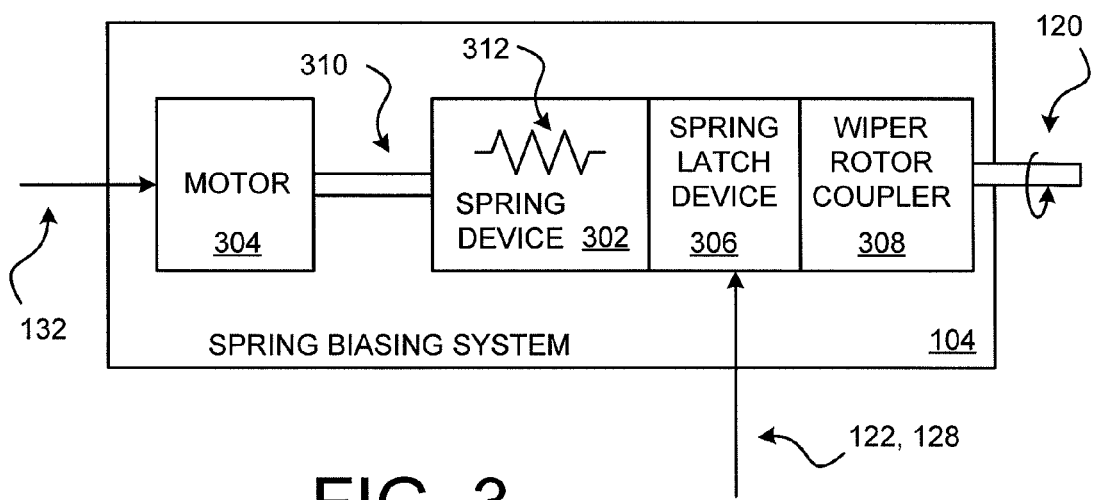
FIG. 3 is a block diagram of an embodiment of a debris removal system employing a spring device.

FIG. 3 is a block diagram of an embodiment of a debris removal system 100 employing a spring device 302. This exemplary embodiment further comprises a motor 304, an optional spring latch device 306, and a wiper rotor coupler 308.

The motor 304 may be any suitable electromechanical device that converts electrical power to mechanical power. The motor 304 may be a rotating machine, such as an alternating current (AC) motor or a direct current motor (DC). In other embodiments, the motor 304 may be a linear machine, such as solenoid or memory wire.

When power is provided over the connection 132 to the motor 304, a motor coupler 310 operates so as to bias a spring 312 so that the spring 312 is moved from a relaxed position to a biased position. That is, the motor 304 converts electrical power into mechanical power that is used to bias the spring 312.

As used herein, the term "bias" refers to applying a force to the spring that displaces a position of the spring. The spring 312 is initially in a relaxed position. The "relaxed position" as used herein refers to an initial position or configuration of the spring 312 wherein the potential energy in the spring 312 is zero, or is relatively small. In the various embodiments, the biasing of the spring 312 continues until the spring 312 reaches a predetermined position or configuration, referred to as a "bias position" of the spring 312. At the end of the biasing process, the spring 312 is restrained in its biased position. The amount of force applied to the spring 312 during the biasing period results in a build up of potential energy in the spring 312.

In some embodiments, the motor 304 retains the spring 312 in its biased position. That is, the motor 304 cocks the spring device 302 until the spring 312 is biased to its biased position. Upon receipt of a release signal via the connection 130, the motor 304 releases the biased spring 312.

In other embodiments, a spring latch device 306 locks the spring 312 in the biased position. That is, the motor 304 cocks the spring device 302 until the spring 312 is biased to its biased position, and is optionally latched by the spring device 302. Upon receipt of a release signal via connections 122 or 128, the spring latch device 306 releases the biased spring 312.

Upon receipt of a release signal via connection 122 or 128, the spring 312 is released and moves from its biased position to its relaxed position. That is, the potential energy stored in the biased spring is released as the spring 312 moves from its biased position to its relaxed position.

The wiper rotor coupler 308 physically couples the spring device 302 to the wiper rotor 120. Accordingly, as the spring 312 is released and moves from its biased position to its relaxed position, the wiper rotor coupler 308 converts the potential energy provided by the spring 312 into a rotational force that rotates the wiper rotor 120.

The spring 312 may employ any suitable structure that may be biased to store a sufficient amount of energy to move the wiper blade 106 so that accumulation of the debris 118 on the surface 114 of the antenna 116 is dislodged. The spring 312 may be a coil spring, a helical spring, a spiral spring, a volute spring, or any other suitable spring device. Preferably, since the power source 102 provides energy at a relatively low level of current and/or voltage over a relatively long duration of time, the biasing of the spring 312 may be gradually performed over time as electrical power becomes available from the power source 102.

The spring latch device 306 may be any suitable mechanical device, electrical device, or combination thereof. For example, the connection 122 may be a suitable trip wire or other physical structure that is coupled to a latching element (not shown) in the spring latch device 306. The interface device 108 may move or otherwise actuate the connection 122 so as to cause sufficient movement of the latching element of the spring latch device 306 so that the spring device 302 is then released.

As another non-limiting example, the connection 122 or 128 may be a communication wire configured to communicate an electrical signal from the interface device 108 or the processor system 110, respectively, to the latching element (not shown) in the spring latch device 306. The signal communicated via the connection 122 or 128 may actuate an electro-mechanical switch (not shown) in the spring latch device 306 so that the spring device 302 is then released.

Some embodiments may use two or more springs 312 and/or may use multiple wiper blades 106. Thus, a plurality of wiper movements may be performed using previously accumulated electrical power.

Figure 4:
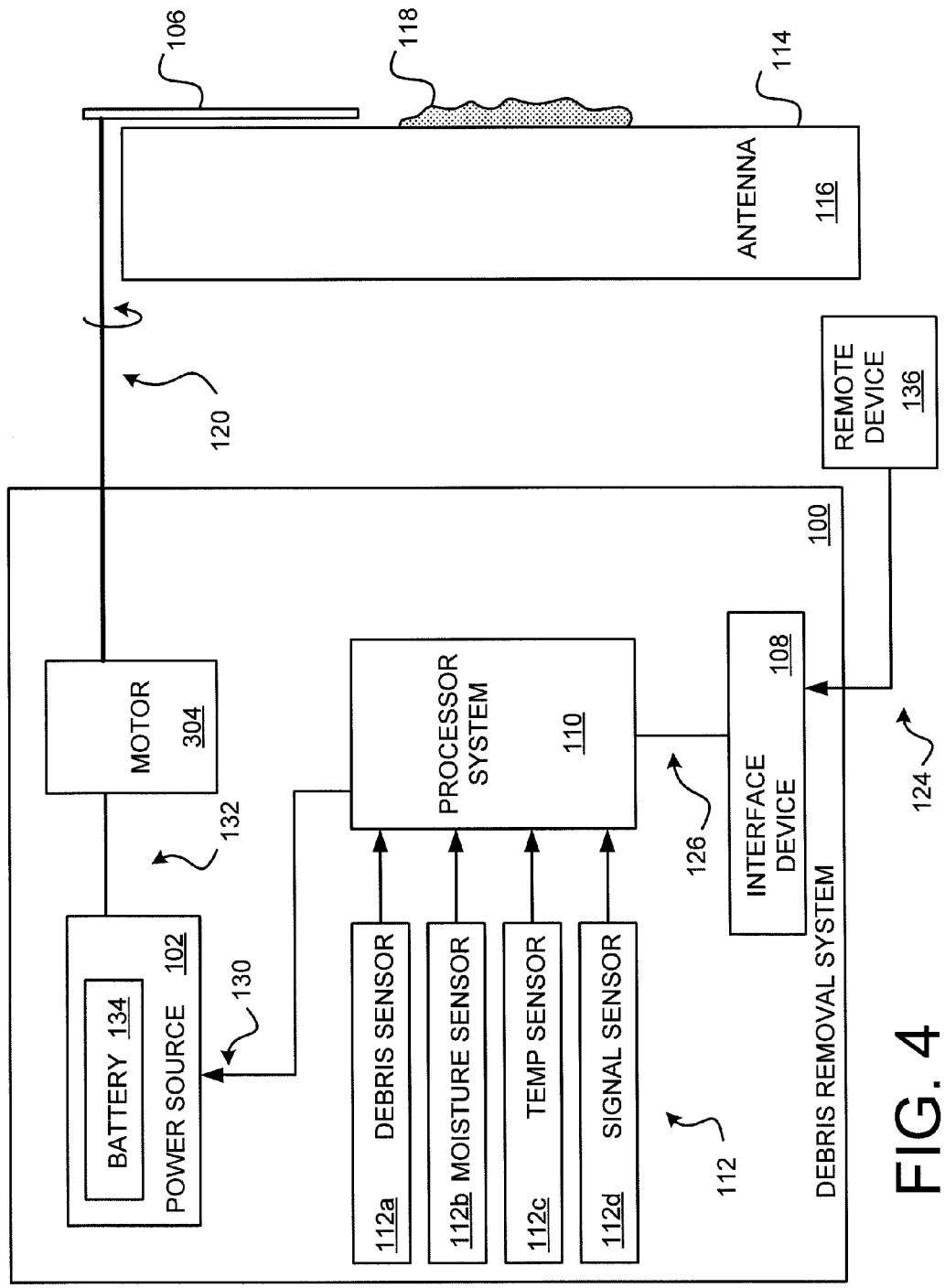
FIG. 4 is a block diagram of an alternative embodiment of a debris removal system employing a motor that operates the wiper blade.

FIG. 4 is a block diagram of an alternative embodiment of a debris removal system 100 employing a motor 304 that operates the wiper blade 106. The motor 304 may be a low power motor that draws a sufficient amount of stored power from the battery 134 to directly operate the wiper blade 106. Suitable gears (not shown) may be used to increase the efficiency and effectiveness of the operation of the motor 304.

Other embodiments may be configured to remove debris or the like from the surfaces of other devices. For example, an embodiment may be configured to remove snow from the lens of a light or from the roof of a tent or other structure.

It should be emphasized that the above-described embodiments of the debris removal system 100 are merely possible examples of implementations of the invention. Many variations and modifications may be made to the above-described embodiments. All such modifications and variations are intended to be included herein within the scope of this disclosure and protected by the following claims.

The invention claimed is:

1. A debris removal system that removes debris from a surface of a dish antenna, comprising:
   a wiper rotor;
   a wiper blade coupled to the wiper rotor, wherein the wiper blade is positioned over the surface of the dish antenna, and wherein the wiper blade is configured to remove debris from the surface in response to a rotational movement of the wiper rotor that rotates the wiper blade over the surface of the dish antenna;
   a spring coupled to the wiper rotor, wherein the spring is configured to store a potential energy as the spring is biased from a relaxed position to a biased position;
   a motor coupled to the spring, wherein the motor is configured to convert received electrical power into mechanical power that biases the spring from the relaxed position to the biased position;
   a remote device configured to receive a user input corresponding to a command to remove the debris from the surface of the dish antenna, and further configured to communicate an electrical control signal corresponding to the user input; and
   an interface device communicatively coupled to the remote device, wherein the interface device is configured to receive the electrical control signal from the remote device, where in response to receiving the electrical control signal at the interface device the spring is released from the biased position to the relaxed position, and wherein the stored potential energy is released from the spring as the spring returns to the relaxed position, and
   wherein the potential energy that is released from the spring is converted to mechanical energy that rotates the wiper rotor such that the rotation of the wiper rotor moves the wiper blade over the surface of the dish antenna.

2. The debris removal system of claim 1, wherein the interface device receives a wireless electrical control signal from the remote device.

3. The debris removal system of claim 1, wherein the interface device is a first interface device configured to receive the wireless electrical control signal from the remote device, and further comprising:
   a second interface device, wherein the second interface device is a mechanical device coupled to a cord and coupled to the spring, where in response to actuation of the cord by a person, actuation of the cord causes the second interface device to release the spring is from the biased position to the relaxed position.

4. A debris removal system that removes debris from a surface of a dish antenna, comprising:
   a wiper rotor;
   a wiper blade coupled to the wiper rotor, wherein the wiper blade is positioned over the surface of the dish antenna, and wherein the wiper blade is configured to remove debris from the surface of the dish antenna in response to a rotational movement of the wiper rotor that rotates the wiper blade over the surface of the dish antenna;
   a spring coupled to the wiper rotor, wherein the spring is configured to store a potential energy as the spring is biased from a relaxed position to a biased position;
   a motor coupled to the spring, wherein the motor is configured to convert received electrical power into mechanical power that biases the spring from the relaxed position to the biased position; and
   a spring latch device coupled to the spring, wherein the spring latch device latches the spring in the biased position, and wherein the spring latch device is configured to release the spring from the biased position such that the spring returns from the biased position to the relaxed position to release the stored potential energy as the spring returns from the biased position to the relaxed position,
   wherein the released potential energy from the spring is converted to mechanical energy that rotates the wiper rotor such that the rotation of the wiper rotor moves the wiper blade over the surface of the dish antenna.

5. A debris removal system that removes debris from a surface of a dish antenna, comprising:
   a wiper rotor;
   a wiper blade coupled to the wiper rotor, wherein the wiper blade is positioned over the surface of the dish antenna, and wherein the wiper blade is configured to remove debris from the surface in response to a rotational movement of the wiper blade;

a spring coupled to the wiper rotor, wherein the spring is configured to store a potential energy as the spring is biased from a relaxed position to a biased position; and a motor coupled to the spring, wherein the motor is configured to convert received electrical power received from a power source into mechanical power that biases the spring from the relaxed position to the biased position, wherein the motor retains the spring in the biased position, and wherein the motor releases the spring from the biased position to release the stored potential energy as the spring returns to the relaxed position, and wherein the released potential energy from the spring is converted to mechanical energy that rotates the wiper rotor such that the rotation of the wiper rotor moves the wiper blade over the surface of the dish antenna.

6. The debris removal system of claim 4, further comprising:

a power source coupled to the motor and configured to provide the electrical power to the motor, wherein the electrical power is provided using at least one of a low voltage and a low current.

7. The debris removal system of claim 6, wherein the power source is a solar cell array.

8. A debris removal system that removes debris from a surface of a dish antenna, comprising:

a wiper rotor;

a wiper blade coupled to the wiper rotor, wherein the wiper blade is positioned over the surface of the dish antenna, and wherein the wiper blade is configured to remove debris from the surface of the dish antenna in response to a rotational movement of the wiper rotor that rotates the wiper blade;

a spring coupled to the wiper rotor, wherein the spring is configured to store a potential energy as the spring is biased from a relaxed position to a biased position; and a motor coupled to the spring, wherein the motor is configured to convert received electrical power into mechanical power that biases the spring, wherein the spring is released from the biased position to release the stored potential energy as the spring returns to the relaxed position, and wherein the released potential energy from the spring is converted to a mechanical energy that rotates the wiper rotor to move the wiper blade over the surface of the dish antenna.

* * * * *

UNITED STATES PATENT AND TRADEMARK OFFICE
CERTIFICATE OF CORRECTION

PATENT NO.         : 8,468,636 B2
APPLICATION NO.    : 12/698782
DATED              : June 25, 2013
INVENTOR(S)        : Thompson et al.

Page 1 of 1

It is certified that error appears in the above-identified patent and that said Letters Patent is hereby corrected as shown below:

In the Claims:

In Claim 3, at Column 6, Line 33, following the word "spring" please delete the word "is"

Signed and Sealed this
Twenty-second Day of October, 2013

Teresa Stanek Rea
*Deputy Director of the United States Patent and Trademark Office*